Aug. 7, 1934.                    E. B. KERST                    1,969,613
                        AUTOMATIC FEED FOR DRIERS
                          Filed May 4, 1933           3 Sheets-Sheet 1
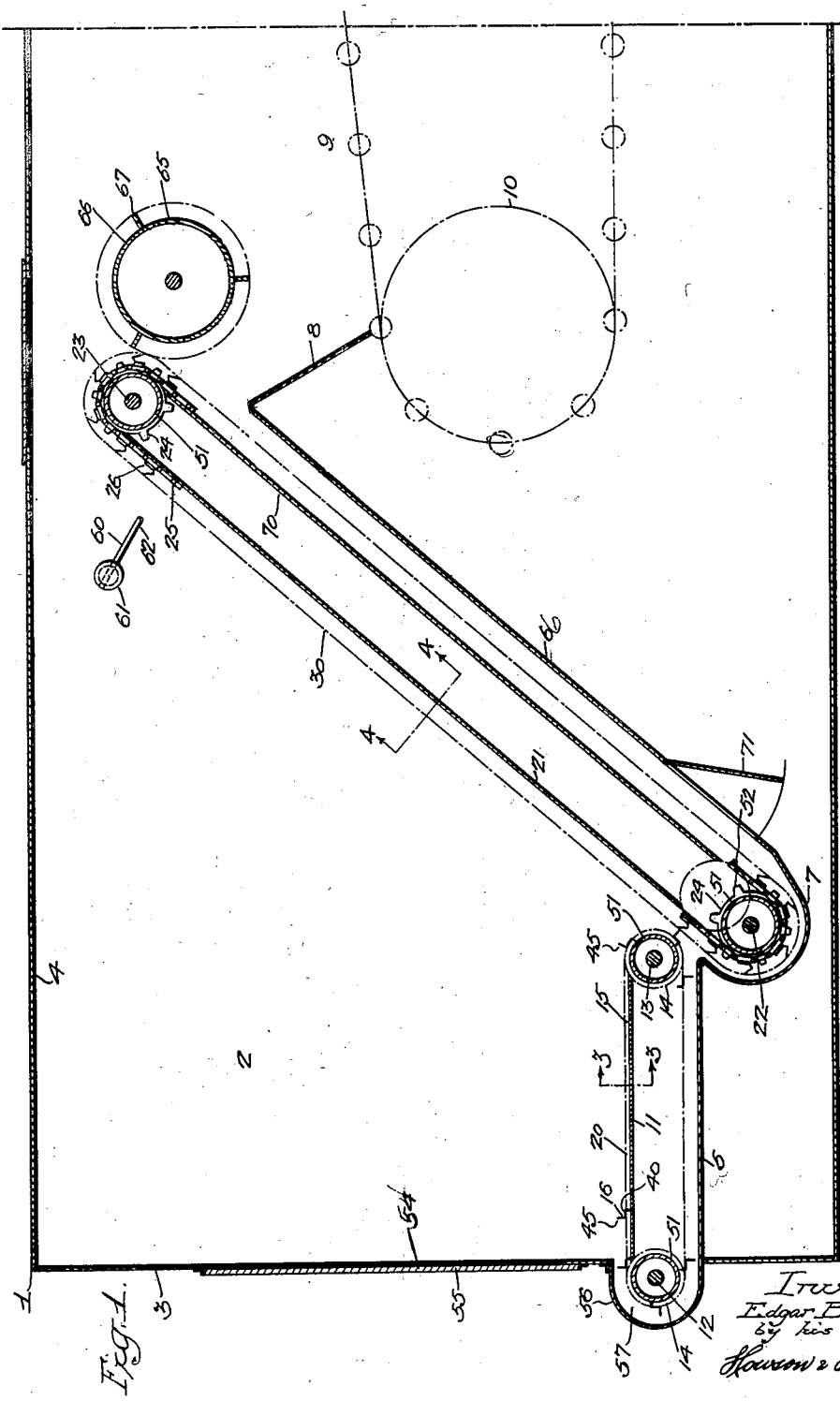

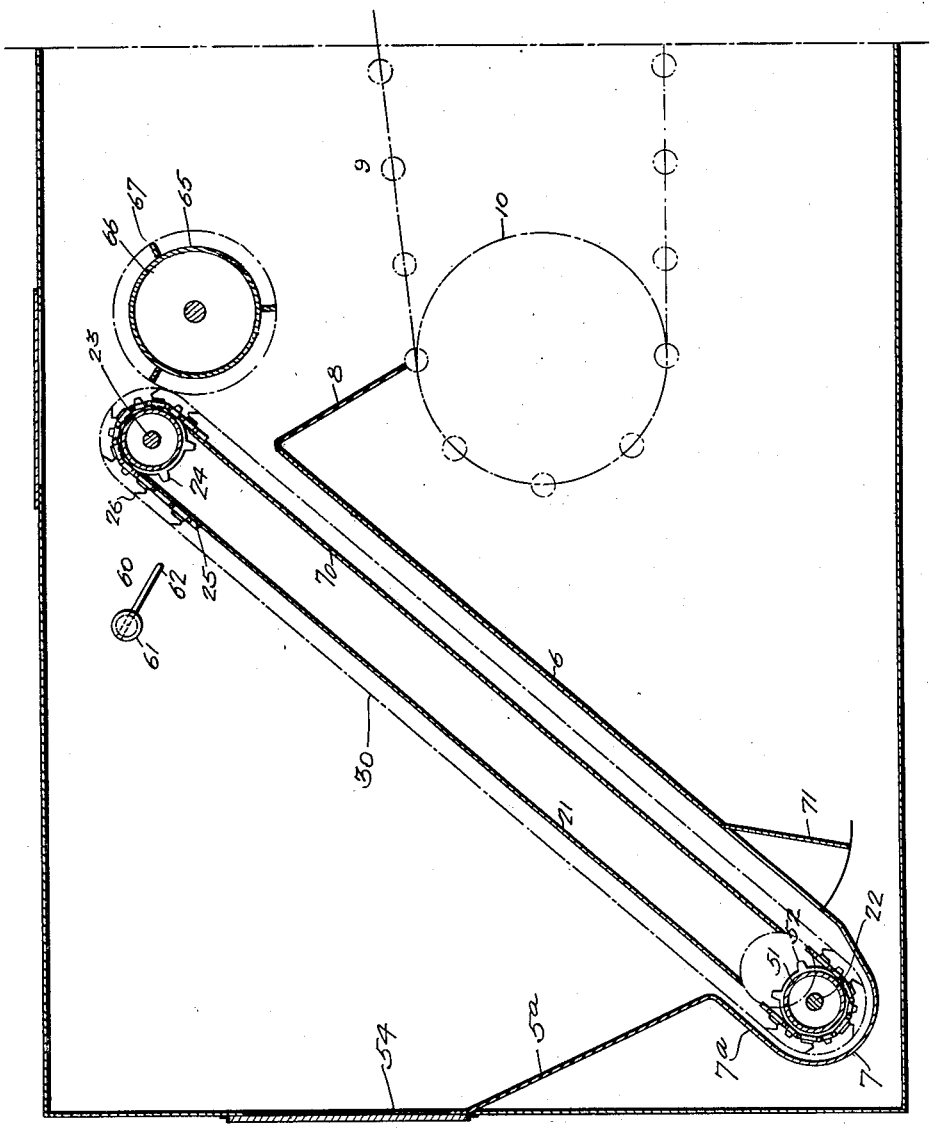

Aug. 7, 1934.  E. B. KERST  1,969,613
AUTOMATIC FEED FOR DRIERS
Filed May 4, 1933   3 Sheets-Sheet 3
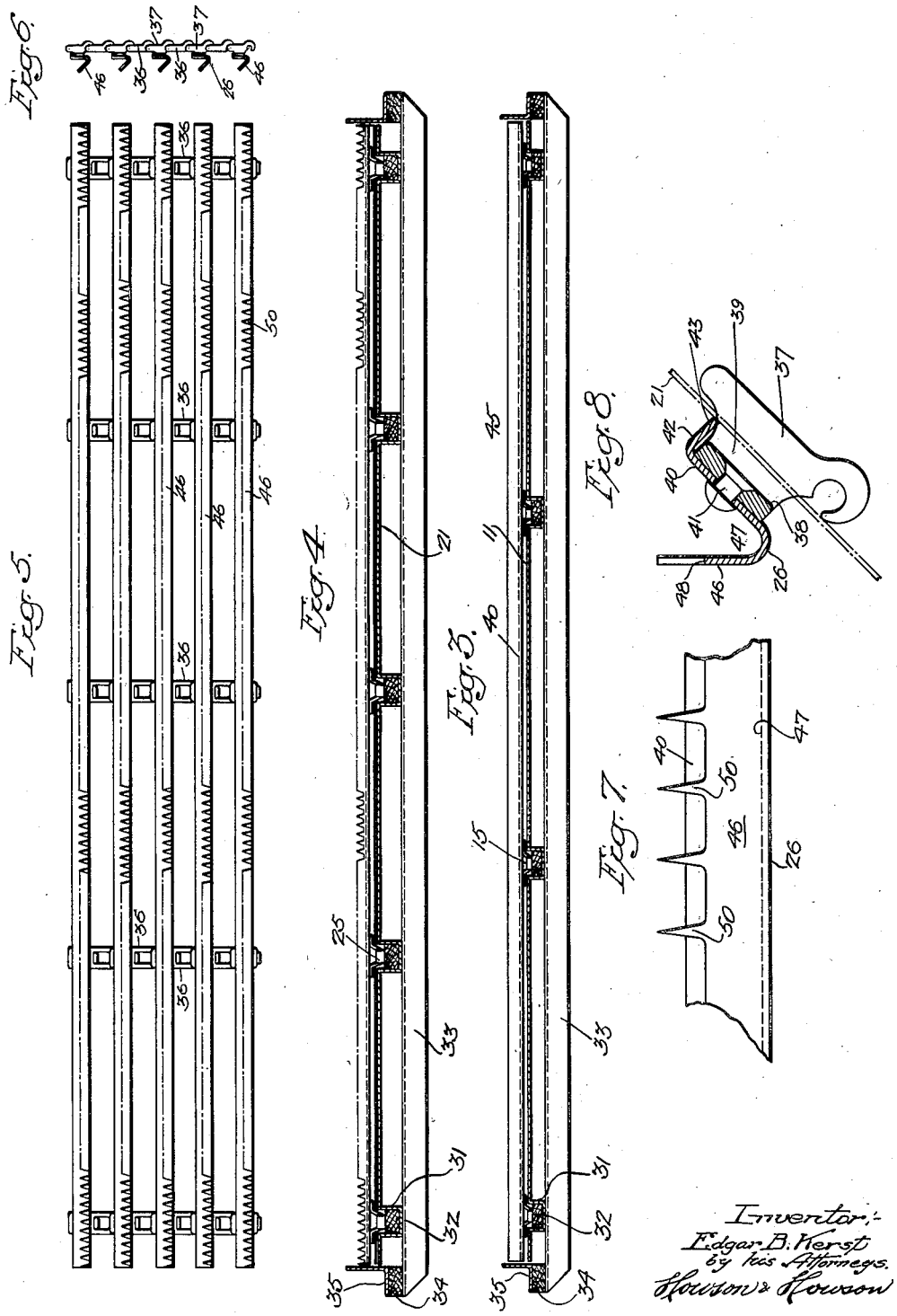

Patented Aug. 7, 1934

1,969,613

UNITED STATES PATENT OFFICE 1,969,613

AUTOMATIC FEED FOR DRIERS

Edgar B. Kerst, Philadelphia, Pa., assignor to Proctor & Schwartz, Incorporated, Philadelphia, Pa., a corporation of Pennsylvania Application May 4, 1933, Serial No. 669,416

11 Claims. (Cl. 198—52)

This invention relates to automatic feeding devices such as are used in conjunction with driers, weighing machines, etc. for handing fibrous materials, such as cotton, cotton linters, hair and etc., wherein the material is drawn continuously from a large bulk in a suitable hopper by means of a spiked apron which subsequently deposits the material in a weighing machine scoop or on the carrying conveyer of a drying or other processing apparatus, as the case may be.

In devices of this type it has been customary to employ an endless apron composed of canvas or similar flexible material having transversely extending wooden slats secured to one face thereof in relatively close relation to each other longitudinally of the apron, each slat, or predetermined slats, being provided with relatively sharp pins or spikes arranged to be dragged along and in contact with the bulk of fibrous material maintained in the hopper. The feeding apron normally is driven by a plurality of chains secured to the reverse face of the apron adjacent and intermediate the opposite side edges thereof respectively, which pass around sprockets secured to transversely extending shafts located in the turns of the endless feed apron.

The canvas feed apron, with the wooden slats thereon, requires considerable repair and frequent replacement, due to fine particles of the material becoming lodged between the slats and between the undersides of the slats and the adjacent face of the apron, the material finally becoming so compacted as to cause breaking of the slats and/or forcing of the slats off the rivets by which the slats are secured to the apron. Fine particles of the material work their way through to the inside of the endless apron and collect around the shafts and sprockets and become compressed in the openings of the chain links under the apron to such an extent as to force the slats and the apron loose from the chains, thereby breaking the slats and frequently tearing the apron. It frequently happens that the material being handled is relatively wet, consequently the wooden slats become water soaked and, as a result of the alternate wetting and drying, the useful life thereof is materially shortened.

The object of the present invention is to provide feeding means wherein the wooden slats and canvas apron are supplanted by a fixed platform and a series of relatively spaced metallic slats operable over the face of the platform; wherein each slat is provided along its advancing edge with a flange which functions as a scraper to drag the heavier material along and over the face of the fixed platform; and wherein each slat, along its rear edge, is provided with a trough or pocket for conveying the finer particles of material from the hopper to the subsequent handling apparatus; and wherein the slats, adjacent the rear edges of the troughs or pockets formed therein, are provided with relatively sharp teeth or spike-like points by which the material is raked from the bulk in the hopper and conveyed along the supporting platform.

The slats are secured directly to alternate links of the chains and the intermediate links only cooperate with the teeth of the sprocket wheels around which the chains pass, therefore, the teeth of the sprockets act as means for automatically keeping the openings in the chain clear of the material.

Collection of particles of material around the sprocket shafts at the turns of the feeding conveyer is prevented by the provision of a drum intermediate each pair of sprockets on each shaft and having its peripheral surface substantially tangent to the carrying surface of the supporting platform.

The construction and operation of the feeding device forming the subject of the present invention will be more fully disclosed hereinafter, reference being had to the accompanying drawings; of which:

Fig. 1 is a diagrammatic sectional elevation through the hopper or feed end of a drier for fibrous materials, showing a horizontal drag conveyer operating in conjunction with an incline feeding conveyer which latter deposits the material on the carrying conveyer of the drier;

Fig. 2 is a view similar to Fig. 1 showing an apparatus wherein the horizontal drag conveyer is eliminated;

Fig. 3 is a transverse sectional elevation taken on the line 3—3, Fig. 1;

Fig. 4 is a transverse sectional elevation taken on the line 4—4, Fig. 1;

Fig. 5 is a fragmentary plan view of the inclined feeding conveyer shown in Figs. 1, 2 and 3;

Fig. 6 is a side elevation of the conveyer as shown in Fig. 5; and

Figs. 7 and 8 are respectively front elevation and sectional views showing the toothed feeding conveyer in detail.

As shown in Fig. 1; the feed end of a suitable drier is illustrated at 1 and includes a hopper 2 defined by an end wall 3, roof 4, a horizontal bottom portion 5 and an inclined bottom portion 6, between and connecting which is a well or boot 7 for purposes hereinafter described.

The upper end of the inclined bottom 6 is bent outwardly and downwardly to provide a chute 8 for directing material on to the upper carrying run 9 of a suitable conveyer 10, by which the material is carried through the drier or other processing apparatus.

Spaced above the horizontal floor 5 of the hopper 2 is a horizontal platform 11 at the opposite ends of which are rotatably mounted transversely extending shafts 12 and 13 respectively. Secured on the shafts 12 and 13 are sprockets 14, 14, around which pass drive chains 15, 15. Secured to the chains 15, 15 and extending transversely of the hopper 2 is a series of relatively spaced drag bars 16, which collectively constitute a horizontal drag conveyer 20.

Spaced from and disposed substantially parallel to the inclined bottom 6, and extending transversely of the hopper 2, is a fixed platform 21 at the lower end of which, and located in the well 7, is rotatably mounted a drive shaft 22. At the opposite end of the platform 21 is a second transversely extending rotatably mounted shaft 23. Secured to the shafts 22 and 23 are sprockets 24, 24 about which pass drive chains 25, 25. Secured to the chains 25, 25 is a series of relatively spaced transversely extending slats or drag bars 26, 26 which collectively constitute the inclined feeding conveyer 30.

The platforms 11 and 21 respectively shown in Figs. 3 and 4 are composed of sheet metal and are provided with laterally spaced depending channels 31, 31 in which are disposed wooden rails 32, 32. The links of the chains 15 and 25 respectively slide on the wooden rails 32.

The channels 31, 31 rest on and are secured to transversely extending supporting beams 33. The beams 33, 33, adjacent the outer edges of the platforms 11 and 21, are connected by longitudinal stringers 34. Upon the upper surfaces of the stringers 34, 34 are mounted angle bars 35, 35 which constitute side walls or flanges for the platforms 11 and 21 respectively, by which the material is maintained on the said supporting platform.

Each of the chains 15 and 25 is composed of a series of pivotally connected links 36, which, in the present instance, alternate with attachment links 37. The attachment links 37, 37 are provided with laterally extending wings 38 disposed in a plane above and spaced from that of the body of the chain by outwardly flaring walls 39, 39.

Each of the slats or drag bars 16 and 26 is composed of relatively heavy sheet metal, preferably of a non-rusting type, and includes a body portion 40 disposed in a plane substantially parallel to the plane of the drive chains and to the plane of the platform 11 or 21, as the case may be. The body portions 40 of the slats 16 and 26 are each permanently secured to the wings 38 of the attachment links 37, by means or rivets 41.

The leading edge of each slat is provided with a depending flange 42, the lower edge 43 of which is adapted to substantially contact with and scrape over the upper surface of the material-supporting platform 11 or 21 for the purpose of dragging material along the platform.

In the case of the horizontal drag conveyer 20 the slats 16 are each provided with a vertically extending flange 45 disposed substantially at right angles to the body 40 of the slat.

In the case of the slats 26 of the inclined feeding conveyer 30 the rear edge of the body portion 40 of each slat is bent upwardly at an acute angle to the plane of the body portion 40 in the form of a flange 46 whereby a trough or pocket 47 is formed in each of the slats 26.

Formed integrally with and projecting above the upper edge 48 of the flange 46 and extending substantially in the plane of said flange 46 is a series of relatively sharp pin-like projections 50, 50 which are relatively spaced along the said flange 46, for the purpose of catching in the bulk of material lying in the hopper 2 or that fed by the drag conveyer 20 to the carrying run of the feeding conveyer 30.

Mounted on and surrounding the shafts 12, 13, 22 and 23, intermediate the sprocket wheels 14 and 24 thereon, are cylindrical shields or drums 51, 51 which prevent the accumulation of material about the said shafts.

As clearly shown in the drawings, the links 36 and 37 of the chains 15 and 25 are open completely through the chains. The teeth 52 of the sprocket wheels 14 and 24 cooperate solely with the intermediate links 36 and thereby readily force out any material which may tend to collect in the openings of the said intermediate links of the chain.

The hopper 2 may be charged through an opening 54 formed in the end wall 3 and normally closed by a door 55. The end wall 3 is provided with a lateral transversely extending semi-cylindrical protuberance 56 providing a chamber 57 for housing the outer end of the drag conveyer 20 outside the end wall 3, to prevent accumulation of material between the said outer end of the drag conveyer and the end wall 3 of the housing.

In operation the hopper 2 is charged in the manner above noted, whereby the material rests on the upper run of the drag conveyer 20 and the supporting platform 11 and on the upper run of the feeding conveyer 30 and the supporting platform 21. The material is constantly urged toward the upper run of the feed conveyer 30 by the slats 16 of the drag conveyer 20 while the spike points 50, 50 on the slats 26 of the feed conveyer 30 drag the material out of the bulk and upwardly over and around the upper end of the feeding conveyer 30, whereupon the upper turn of the conveyer dumps the material on to the chute 8 and the upper run 9 of the conveyer by which the material is carried through the drier.

Surplus material on the carrying run of the feed conveyer 30 is removed by a scraper 60 which may be in the form of an oscillating beater, if desired, said beater comprising a shaft or bar 61 extending transversely of the apparatus and provided with a blade or a series of fingers illustrated at 62, which drag the surplus material off the carrying run of the feed conveyer 30.

The material is removed from the spikes 50 of the slats 26 by means of a rotating beater 65 comprising a reel or cylinder 66 having radially extending plates or pins 67 which are arranged to rotate substantially tangential to the arc described by the free outer ends of the pins 50, for beating the material off the said pins as the slats 26 round the upper turn of the feed conveyer 30.

In order to prevent material from being blown back under the platform 21 a baffle 70 is provided substantially parallel to and intermediate the platform 21 and inclined floor 6.

Adjacent the well 7 the bottom wall 6 of the hopper 2 is provided with a trap door 71 by which any material falling between the baffle 70 and floor 6 may be readily removed.

The device illustrated in Fig. 2 is substantially the same as that shown in Fig. 1 with the exception that the horizontal drag conveyer 20 is eliminated and an inclined wall 5a is provided in place of the horizontal floor 5 and extends from the feed opening 54a to a top wall extension 7a of the well 7, whereby the material is fed directly to the upper carrying run of the inclined feed conveyer 30.

I claim:

1. A slat for a feed conveyer comprising a body portion, a flange extending at an acute angle to the body portion along one edge thereof in the form of a trough, and a second flange extending along and from the opposite edge of said body portion in an opposite direction to the first said flange in the form of a scraper.

2. A slot for a feed conveyor comprising a body portion, a flange extending at an acute angle to the body portion along one edge thereof in the form of a trough, a second flange extending along and from the opposite edge of said body portion in an opposite direction to the first said flange in the form of a scraper, and a plurality of laterally spaced pins projecting from the free edge of the trough flange.

3. A feeding apparatus comprising a material-supporting platform, a conveyer comprising a plurality of relatively spaced slats each comprising a trough disposed above said supporting platform, and a scraper substantially engaging said platform.

4. A feeding apparatus comprising a material-supporting platform, a conveyer comprising a plurality of relatively spaced slats each comprising a trough disposed above said supporting platform, a scraper substantially engaging said platform, and a plurality of relatively spaced points along one edge of and projecting from said trough.

5. A feeding apparatus comprising a material-supporting platform, a conveyer comprising a series of relatively spaced slats each comprising a body portion spaced above said platform, a flange depending from one edge of the body portion toward said platform in the form of a scraper, an oppositely extending flange on the opposite edge of the body portion in the form of a trough, and a plurality of relatively spaced points projecting from the free edge of the trough flange.

6. A feeding apparatus comprising a material-supporting platform, a conveyer comprising laterally spaced open link drive chains, channels in said platform for said drive chains, slats respectively secured to predetermined links of said drive chains and operable thereby over said platform, and sprockets for said drive chains in alignment with said channels and having teeth cooperating solely with and projecting through open intermediate links of the chains.

7. A feeding apparatus comprising a material-supporting platform, a conveyer comprising laterally spaced open link drive chains, channels in said platform for said drive chains, slats respectively secured to predetermined links of said drive chains and operable thereby over said platform, sprockets for said drive chains in alignment with said channels and having teeth cooperating solely with and projecting through open intermediate links of the chains, and drums intermediate said sprockets and having peripheral surfaces substantially tangent to said platform.

8. A feeding apparatus comprising a hopper, an inclined material-supporting platform in said hopper, relatively spaced slats movable upwardly over the platform and comprising a body portion spaced from the platform, a depending drag flange on the advance edge of the body portion, an upturned trough flange on the rear edge of the body portion, and relatively spaced rake points projecting upwardly from the rear edge of the trough.

9. A feeding apparatus comprising a hopper, an inclined material-supporting platform in said hopper, relatively spaced slats movable upwardly over the platform and comprising a body portion spaced from the platform, a depending drag flange on the advance edge of the body portion, an upturned trough flange on the rear edge of the body portion, relatively spaced rake points projecting upwardly from the rear edge of the trough, and means for feeding bulk material in the hopper toward said inclined platform.

10. A feeding apparatus comprising a hopper, an inclined material-supporting platform in said hopper, relatively spaced slats movable upwardly over the platform and comprising a body portion spaced from the platform, a depending drag flange on the advance edge of the body portion, an upturned trough flange on the rear edge of the body portion, relatively spaced rake points projecting upwardly from the rear edge of the trough, means for feeding bulk material in the hopper toward said inclined platform, and means for removing excess material from the moving slats.

11. A feeding apparatus comprising a hopper, an inclined material-supporting platform in said hopper, relatively spaced slats movable upwardly over the platform and comprising a body portion spaced from the platform, a depending drag flange on the advance edge of the body portion, an upturned trough flange on the rear edge of the body portion, relatively spaced rake points projecting upwardly from the rear edge of the trough, means for feeding bulk material in the hopper toward said inclined platform, means for removing excess material from the moving slats, and means for removing the material from said rake points at the upper end of said inclined platform.

EDGAR B. KERST.